United States Patent
De et al.

(10) Patent No.: US 7,994,257 B2
(45) Date of Patent: Aug. 9, 2011

(54) DOWNWELL SYSTEM WITH SWELLABLE PACKER ELEMENT AND COMPOSITION FOR SAME

(75) Inventors: Dilip K. De, Stephens City, VA (US); William S. Butterfield, Stephens City, VA (US)

(73) Assignee: Stowe Woodward, LLC, Middletown, VA (US)

( * ) Notice: Subject to any disclaimer, the term of this patent is extended or adjusted under 35 U.S.C. 154(b) by 243 days.

(21) Appl. No.: 12/366,725

(22) Filed: Feb. 6, 2009

(65) Prior Publication Data

US 2009/0205816 A1 Aug. 20, 2009

Related U.S. Application Data

(60) Provisional application No. 61/028,969, filed on Feb. 15, 2008.

(51) Int. Cl.
*C08L 9/00* (2006.01)
*C08L 9/02* (2006.01)
*C08L 47/00* (2006.01)
*E21B 33/12* (2006.01)

(52) U.S. Cl. ......... 525/233; 166/179; 166/180; 166/387

(58) Field of Classification Search ................ 277/934, 277/333; 526/930; 166/179, 180, 387; 175/230; 428/36.8, 36.92; 525/233; 507/118, 221; 523/130

See application file for complete search history.

(56) References Cited

U.S. PATENT DOCUMENTS

| | | | |
|---|---|---|---|
| 6,834,725 B2 | 12/2004 | Whanger et al. | |
| 6,840,325 B2 | 1/2005 | Stephenson | |
| 6,907,937 B2 | 6/2005 | Whanger et al. | |
| 7,059,415 B2 | 6/2006 | Bosma et al. | |
| 7,063,164 B2 | 6/2006 | Hilsman et al. | |
| 7,066,285 B2 | 6/2006 | Shaarpour | |
| 7,070,001 B2 | 7/2006 | Whanger et al. | |
| 7,143,832 B2 | 12/2006 | Freyer | |
| 7,152,689 B2 | 12/2006 | Hilsman et al. | |
| 7,228,915 B2 | 6/2007 | Thomson | |
| 2005/0101737 A1* | 5/2005 | Pazur et al. | 525/192 |
| 2005/0113516 A1* | 5/2005 | von Hellens et al. | 525/191 |
| 2005/0269108 A1 | 12/2005 | Whanger et al. | |
| 2007/0056735 A1 | 3/2007 | Bosma et al. | |
| 2007/0144733 A1 | 6/2007 | Murray et al. | |

(Continued)

FOREIGN PATENT DOCUMENTS

EP 1 407 113 B1 3/2006

(Continued)

*Primary Examiner* — Jennifer H Gay
*Assistant Examiner* — Cathleen R Hutchins
(74) *Attorney, Agent, or Firm* — Myers Bigel Sibley & Sajovec (57) ABSTRACT

A composition suitable for use in a packer element for a wellbore includes: a hydrocarbon-swellable polymer, the hydrocarbon-swellable polymer present in the composition in an amount between about 10 and 30 percent by weight; an oil-resistant polymer, the oil-resistant polymer present in the composition in an amount between about 10 and 30 percent by weight; and a hydrocarbon swelling agent, the hydrocarbon swelling agent present in the composition in an amount between about 15 and 60 percent by weight. A composition as described may have a good balance of the swelling properties of the hydrocarbon-swellable polymer and the mechanical properties of the oil-resistant polymer. These properties may be useful in a packer element for a wellbore.

22 Claims, 4 Drawing Sheets

U.S. PATENT DOCUMENTS

2007/0221387 A1     9/2007    Levy

FOREIGN PATENT DOCUMENTS

| | | |
|---|---|---|
| EP | 1 423 583 B1 | 3/2006 |
| WO | WO 03/008756 A1 | 1/2003 |
| WO | WO 03/023185 A1 | 3/2003 |
| WO | WO 2005/090741 A1 | 9/2005 |
| WO | WO 2006/003112 A1 | 1/2006 |
| WO | WO 2006/003113 A1 | 1/2006 |
| WO | WO 2006/045794 A1 | 5/2006 |
| WO | WO 2006/053896 A1 | 5/2006 |
| WO | WO 2006/063988 A1 | 6/2006 |
| WO | WO 2007/084657 A1 | 7/2007 |

* cited by examiner

DOWNWELL SYSTEM WITH SWELLABLE PACKER ELEMENT AND COMPOSITION FOR SAME

RELATED APPLICATION

The present application claims priority from U.S. Provisional Application Ser. No. 61/028,969, filed Feb. 15, 2008, the disclosure of which is hereby incorporated herein in its entirety.

FIELD OF THE INVENTION

The present invention relates generally to a wellbore system for oil exploration, and more particularly to a packer for a wellbore system.

BACKGROUND OF THE INVENTION

A downhole wellbore system typically includes a pipe or other tubular structure that extends into a borehole drilled into the ground. In some instances, a casing is inserted into the wellbore to define its outer surface; in other instances, the rock or soil itself serves as the wall of the wellbore.

Many wellbore systems include a packer, which is designed to expand radially outwardly from the pipe against the walls of the wellbore. The packer is intended to seal segments of the pipe against the wellbore in order to isolate some sections of the wellbore from others. For example, it may be desirable to isolate a section of the formation that includes recoverable petroleum product from an aquifer.

Known sealing members for packers include, for example, mechanical packers which are arranged in the borehole to seal an annular space between a wellbore casing and a production pipe extending into the borehole. Such a packer is radially deformable between a retracted position, in which the packer is lowered into the borehole, and an expanded position, in which the packer forms a seal. Activation of the packer can be by mechanical or hydraulic means. One limitation of the applicability of such packers is that the seal surfaces typically need to be well defined, and therefore their use may be limited to wellbores with casings. Also, they can be somewhat complicated and intricate in their construction and operation. An exemplary mechanical packer arrangement is discussed in U.S. Pat. No. 7,070,001 to Whanger et al., the disclosure of which is hereby incorporated herein in its entirety.

Another type of annular seal member is formed by a layer of cement arranged in an annular space between a wellbore casing and the borehole wall. Although in general cement provides adequate sealing capability, there are some inherent drawbacks such as shrinking of the cement during hardening, which can result in de-bonding of the cement sheath, or cracking of the cement layer after hardening.

Additional annular seal members for packers have been formed of swellable elastomers. These elastomers expand radially when exposed to an activating liquid, such as water (often saline) or hydrocarbon, that is present in the wellbore. Exemplary materials that swell in hydrocarbons include ethylene propylene rubber (EPM and EPDM), ethylene-propylene-diene terpolymer rubber (EPT), butyl rubber, brominated butyl rubber, chlorinated butyl rubber), chlorinated polyethylene, neoprene rubber, styrene butadiene copolymer rubber (SBR), sulphonated polyethylene, ethylene acrylate rubber, epichlorohydrin ethylene oxide copolymer, silicone rubbers and fluorsilicone rubber. Exemplary materials that swell in water include starch-polyacrylate acid graft copolymer, polyvinyl alcohol cyclic acid anhydride graft copolymer, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like and highly swelling clay minerals such as sodium bentonite. Exemplary swellable packers are discussed in U.S. Pat. No. 7,059,415 to Bosma et al. and U.S. Patent Publication No. 2007/0056735 to Bosma et al., the disclosure of each of which is hereby incorporated herein in its entirety.

EPDM is a compound that swells readily when contacted with hydrocarbon; for example, it may swell as much as 140 percent after 70 hours in ASTM #3 oil at 70° C. However, the physical and mechanical properties of EPDM do not match those of some other rubber compounds. It may be desirable to provide a formulation that can capitalize on the swelling properties of EPDM while still having sufficient mechanical strength for use in a packer.

SUMMARY OF THE INVENTION

As a first aspect, embodiments of the present invention are directed to a composition suitable for use in a packer element for a wellbore. The composition comprises: a hydrocarbon-swellable polymer, the hydrocarbon-swellable polymer present in the composition in an amount between about 10 and 30 percent by weight; an oil-resistant polymer, the oil-resistant polymer present in the composition in an amount between about 10 and 30 percent by weight; and a hydrocarbon swelling agent, the hydrocarbon swelling agent present in the composition in an amount between about 15 and 60 percent by weight. A composition as described may have a good balance of the swelling properties of the hydrocarbon-swellable polymer and the mechanical properties of the oil-resistant polymer material. These properties may be useful in a packer element for a wellbore.

As a second aspect, embodiments of the present invention are directed to a composition suitable for use in a packer element for a wellbore that comprises: a hydrocarbon-swellable polymer, the hydrocarbon-swellable polymer present in the composition in an amount between about 15 and 25 percent by weight; a nitrile rubber material, the nitrile rubber material present in the composition in an amount between about 15 and 25 percent by weight; and a hydrocarbon swelling agent, the hydrocarbon swelling agent present in the composition in an amount between about 30 and 45 percent by weight.

As a third aspect, embodiments of the present invention are directed to a composition suitable for use in a packer element for a wellbore that comprises: EPDM present in the composition in an amount between about 15 and 25 percent by weight; HNBR present in the composition in an amount between about 15 and 25 percent by weight; and a hydrocarbon swelling agent comprising polyethylene present in the composition in an amount between about 30 and 45 percent by weight.

As a fourth aspect, embodiments of the present invention are directed to a packer assembly comprising a tubular member and a packer element. The packer element comprises a composition that includes: a hydrocarbon-swellable polymer, the hydrocarbon-swellable polymer present in the composition in an amount between about 10 and 30 percent by weight; an oil-resistant polymer, the oil-resistant polymer present in the composition in an amount between about 10 and 30 percent by weight; and a hydrocarbon swelling agent, the hydrocarbon swelling agent present in the composition in an amount between about 15 and 60 percent by weight.

DETAILED DESCRIPTION OF EMBODIMENTS OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Figure 1:
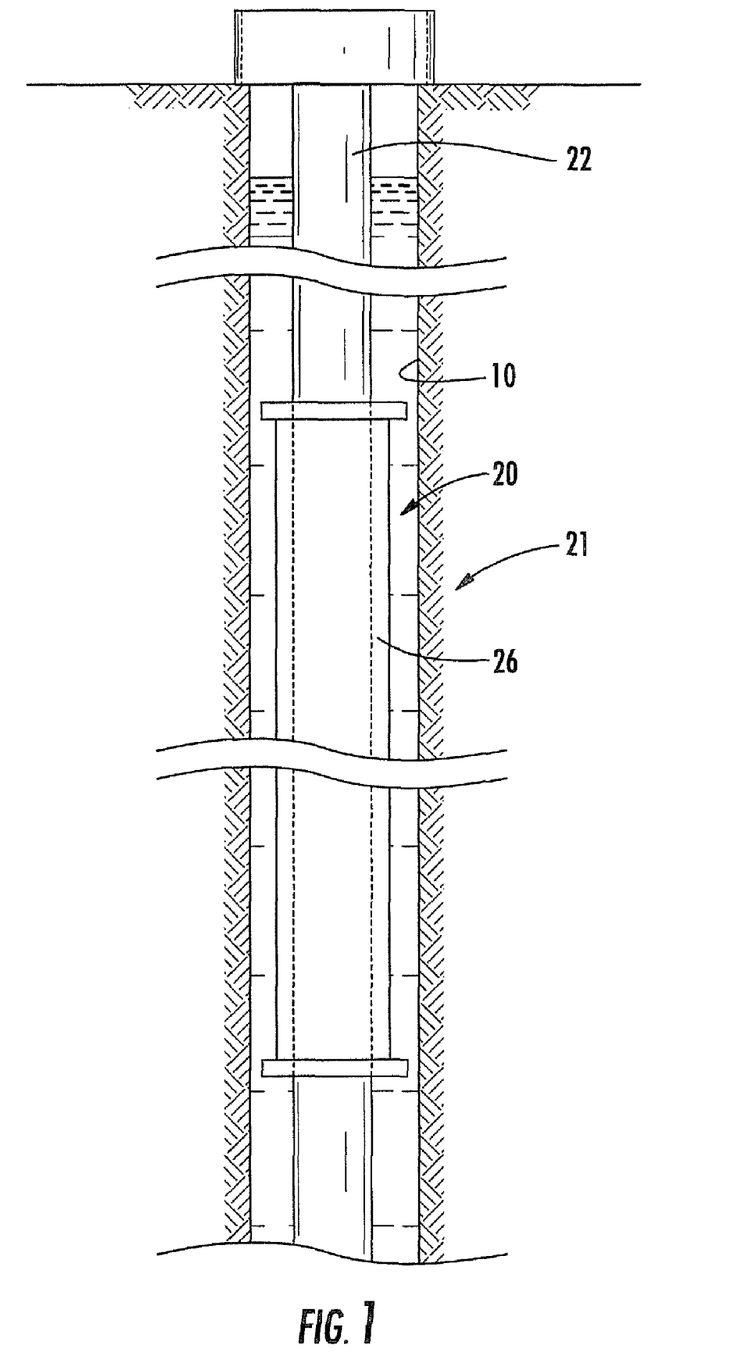
FIG. 1 is a partial section view of a downwell bore and pipe with a packer system according to embodiments of the present invention, wherein the packer element is in an unswelled condition.
Figure 2:
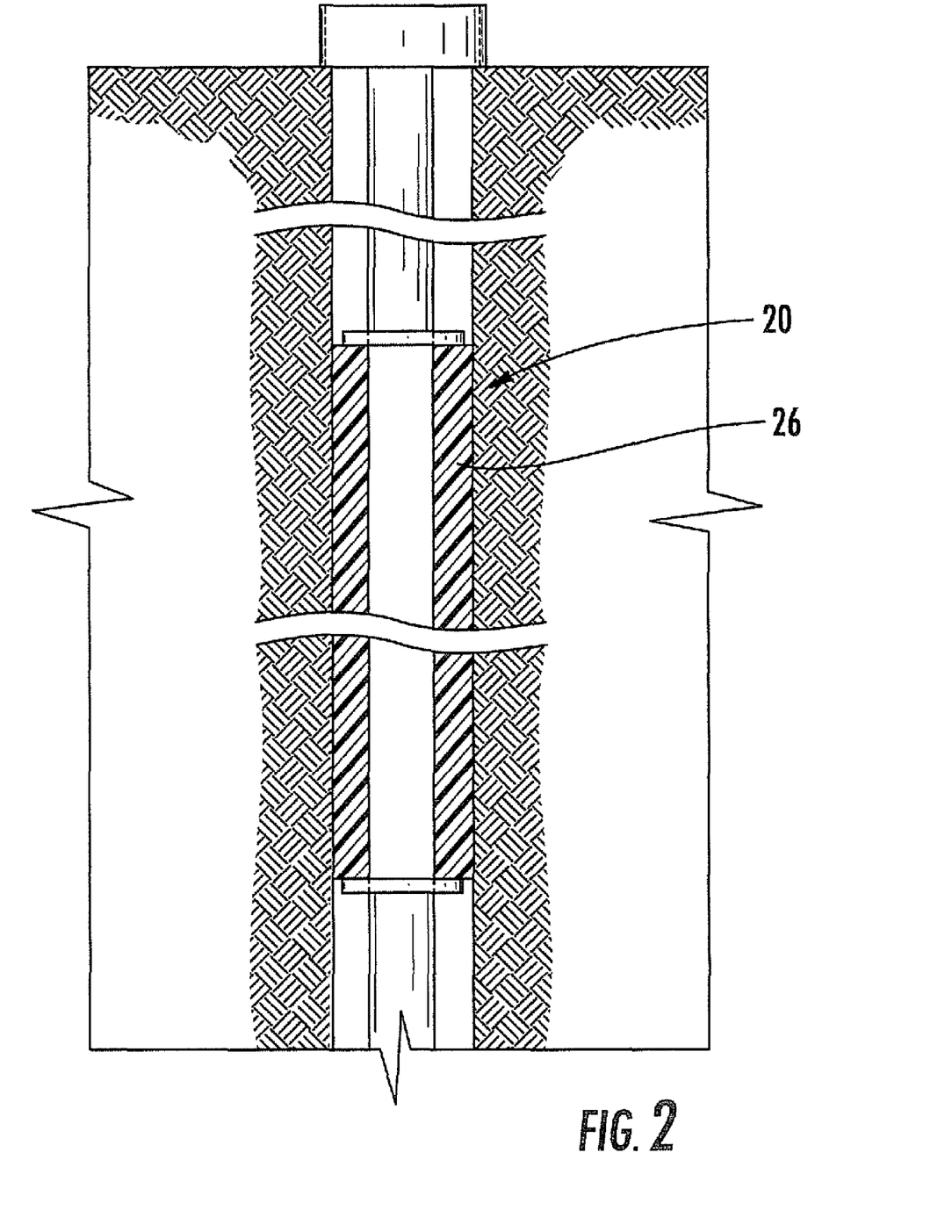
FIG. 2 is a partial section view of the packer system of FIG. 1, wherein the packer element is in a swelled condition.

Turning now to the figures, a downwell pipe assembly, designated broadly at 20, is shown in FIG. 1. The assembly 20 is inserted into a wellbore 10, which is defined by walls in the earth. Although shown here disposed directly into the ground, in some embodiments the assembly 20 may be disposed within a casing or other annular member that is inserted in the earth. In addition, the wellbore 10 is illustrated herein as being substantially vertical, but may also be substantially horizontally disposed or disposed at any angle typically used for wells. As used herein, the term "wellbore" is intended to encompass either of these scenarios. The assembly 20 includes a base pipe 22, which can be any pipe or tubular member typically employed in downwell environments, and a packer system 21. The packer system 21 includes one or more packer elements 26 (only one is shown herein). As shown in FIG. 1, the packer element 26 remains in an unswelled condition until it contacts a swelling fluid. FIG. 2 shows the packer element 26 in a swelled condition (in this instance, after it has contacted a hydrocarbon, such as oil).

As the above discussion makes clear, the packer element 26 should comprise a material that swells when in contact with a hydrocarbon. As is also discussed above, EPDM exhibits significant swelling when in contact with a hydrocarbon, but may have inadequate mechanical strength for some packer element applications. In embodiments of the present invention, the material of the packer element 26 comprises a hydrocarbon-swellable polymer, an oil-resistant polymer (which can help to increase mechanical properties), and a hydrocarbon swelling agent.

The hydrocarbon-swellable polymer of the packer material can provide the material with significant volume expansion (swelling) when contacted with hydrocarbon. Exemplary hydrocarbon-swellable materials include EPDM, EPM, SBR, butyl rubber, neoprene rubber, silicone rubber, ethylene vinyl acrylate, and copolymers and blends thereof. The hydrocarbon-swellable polymer may be present in an amount between about 10 and 30 percent by weight; in some embodiments, the hydrocarbon-swellable polymer may be present in an amount of between about 15 and 25 percent by weight. An exemplary hydrocarbon-swellable polymer is NORDEL™ IP 4640 EPDM resin, available from Dow Plastics, Midland, Mich.

The oil-resistant polymer can provide increased physical and mechanical properties to the packer material. As used herein, an "oil-resistant polymer" is one that swells no more than about 25 percent in ASTM #3 oil at 100° C. after 70 hours. The oil-resistant polymer may be present in an amount between about 10 and 30 percent by weight; in some embodiments, the oil-resistant polymer compound may be present in an amount between about 15 and 25 percent by weight. Exemplary oil-resistant polymers include nitrile rubber compounds, such as nitrile butadiene rubber (NBR), hydrogenated nitrile butadiene rubber (HNBR), carboxylated nitrile rubber (XNBR), acrylic rubber (ACM), fluororubber (FKM), fluorosilicone rubber (FVMQ, FVQ), polysiloxane rubber (Q), ethylene acrylate rubber (EAM), and ethylene vinylacetate rubber (EVA). Nitrile rubber compounds may be particularly suitable for some embodiments. An exemplary HNBR compound is Zetpol 2020L, available from Zeon Chemicals, Louisville, Ky.

The hydrocarbon swelling agent can be a component that causes the packer material to swell when in contact with hydrocarbon. In some embodiments, the swelling agent may be a sorbent for hydrocarbon. Also, in some embodiments the swelling agent may comprise polyethylene (particularly linear polyethylene, which may have a molecular weight of between about 200,000 and 230,000) and/or other polymers, which may be combined with a hydrocarbon wax or the like. Other suitable swelling agents include thermoplastic polymer and copolymer mixtures and polyalphaolefins. Exemplary hydrocarbon swelling agents are the RUBBERIZER® sorbent, available from Haz-Mat Response Technologies, San Diego, Calif., VYBAR® polymers, available from Baker Petrolite (Sugar Land, Tex.), and AQUA N-CAP polymer, available from RTA Systems, (Oklahoma City, Okla.). The hydrocarbon swelling agent can also be an inorganic material, such as oil-absorbent minerals. Some well known oil-absorbing minerals are talc, diatomaceous earth, fullers earth, silica, and bentonite. The minerals may be chemically treated (e.g., with amines) to enhance their oil-absorbing capabilities. The swelling agent may be present in the material in an amount between about 15 and 60 percent by weight, and in some embodiments may be present in an amount between about 30 and 45 percent.

The material of the packer element 26 may also include fillers and additives that enhance its manufacturing or performance properties and/or reduce its costs. Exemplary filler materials include inorganic oxides such as aluminum oxide ($Al_2O_3$), silicon dioxide ($SiO_2$), magnesium oxide (MgO), calcium oxide (CaO), zinc oxide (ZnO) and titanium dioxide ($TiO_2$), carbon black (also known as furnace black), silicates such as clays, talc, wollastonite ($CaSiO_3$), magnesium silicate ($MgSiO_3$), anhydrous aluminum silicate, and feldspar ($KAlSi_3O_8$), sulfates such as barium sulfate and calcium sulfate, metallic powders such as aluminum, iron, copper, stainless steel, or nickel, carbonates such as calcium carbonate ($CaCo_3$) and magnesium carbonate ($MgCo_3$), mica, silica (natural, fumed, hydrated, anhydrous or precipitated), and nitrides and carbides, such as silicon carbide (SiC) and aluminum nitride (AlN). These fillers may be present in virtually any form, such as powder, pellet, fiber or sphere. Exemplary additives include polymerization initiators, activators and accelerators, curing or vulcanizing agents, plasticizers, heat stabilizers, antioxidants and antiozonants, coupling agents, pigments, and the like, that can facilitate processing and enhance physical properties.

The packer element 26 can be applied by any manner known to those skilled in this art to be suitable for the application of polymers to an underlying surface. For example, the packer element 26 may be applied over the base pipe 22 through an extrusion process in which strips of the packer element 26 are extruded through an extrusion die, then, while still warm, are overlaid over the base pipe 22. The packer element strips are typically between about 0.030 and 0.125 inches in thickness and are applied in an overlapping manner, with the result that total thickness of the packer element 26 is typically between about 0.5 and 2.0 inches. In some embodiments, the packer element does not directly overlie the base pipe 22, but instead directly overlies a rubber base (which typically includes no hydrocarbon swelling agent) or a tie-in layer that directly overlies such a base layer.

An exemplary formulation for the material for the packer element 26 is shown in Table 1.

TABLE 1

| Ingredient | Amount (parts) |
|---|---|
| HBNR | 50 |
| EPDM | 50 |
| Polyethylene/Wax Swelling Agent | 100 |
| Plasticizer | 10 |
| Filler | 35 |
| Tackifier | 5 |
| Activator | 5 |
| Antioxidants | 2 |
| Curing agent | 7 |

Figure 3:
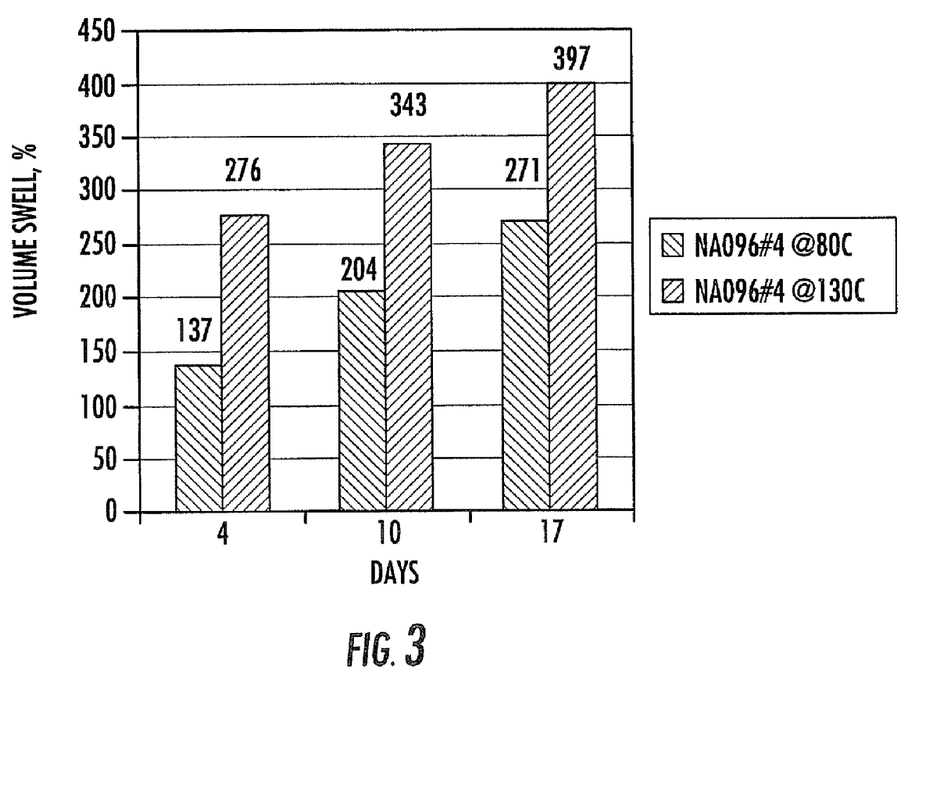
FIG. 3 is a bar graph showing the swelling of materials of the present invention in oil at either 80° C. or 130° C. over different periods of time.
Figure 4:
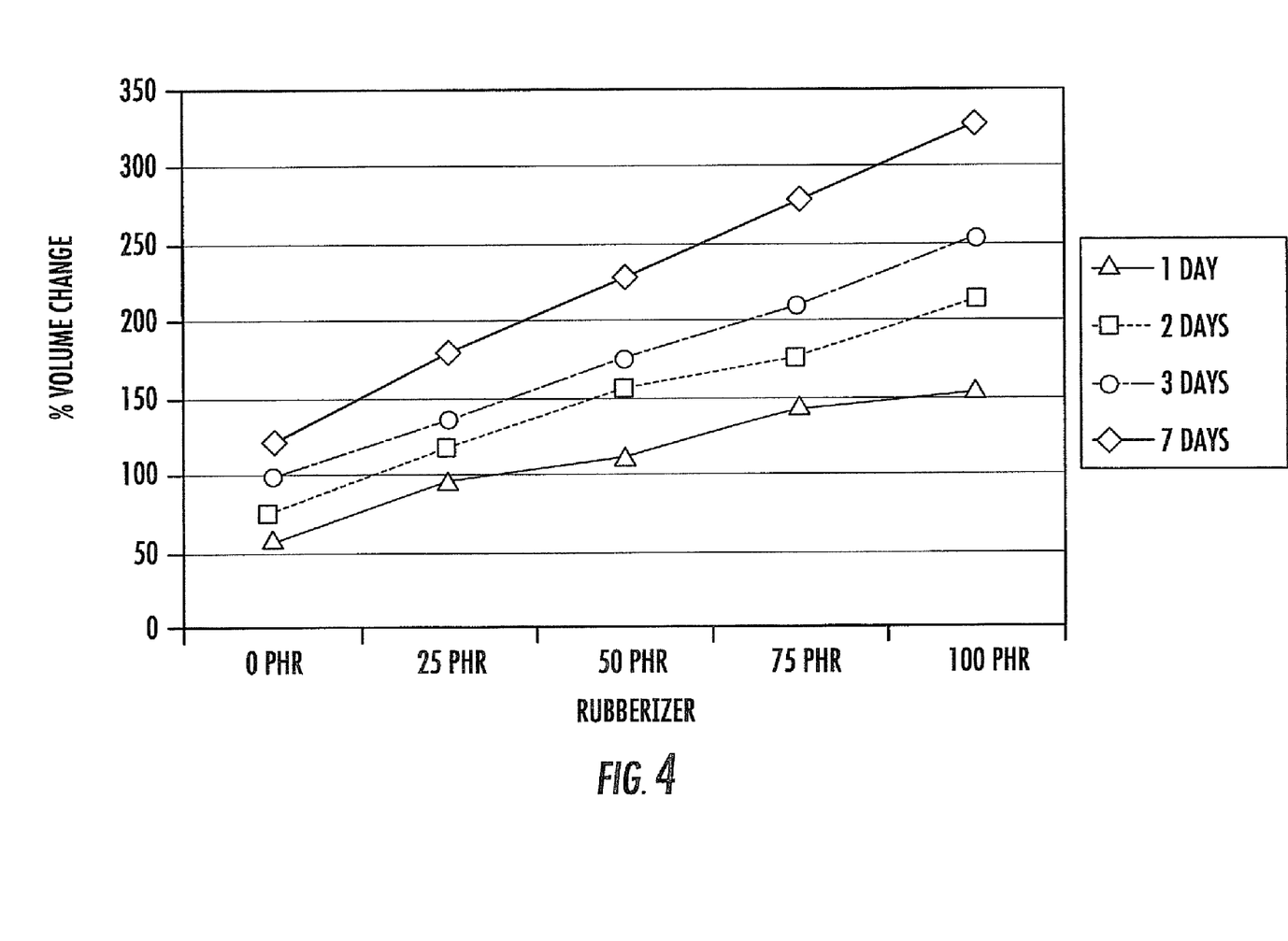
FIG. 4 is a graph plotting swelling (volume change) as a function of percentage of swelling agent for packer materials for different immersion periods in oil at 150° C.

A material of this exhibited significant volume increase (swelling) in oil under heat (see FIGS. 3 and 4). Mechanical properties of the material are set forth in Table 2.

TABLE 2

| Property | Room Temp unimmersed | 2 Days in Oil @ 176° F. | 2 Days in Oil @ 176° F. |
|---|---|---|---|
| Tensile Strength (psi) | 873.3 | 175.9 | 145.7 |
| Yield Strength (lb-ft/in) | 152 | 28.4 | 25.8 |
| Percent Elongation (%) | 488.6 | 172.4 | 159.6 |

Those skilled in this art will appreciate that the packer element may take other forms. For example, the packer element may be divided into multiple segments, any of which may include end caps to facilitate radial swelling and/or insertion of the packer assembly into the wellbore. The packer element may be covered with a protective layer that is removed prior to swelling. The thickness of the packer element may vary at different axial locations along the packer. Also, although the packer element described herein may be formed of material that swells in hydrocarbon, the packer element may be one element of an overall packer system that also includes elements that swell in water or other fluids, or part of a system that also includes elements that swell via hydraulic or mechanical means. Other variations may be apparent to those skilled in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A composition suitable for use in a packer element for a wellbore, comprising:
    a hydrocarbon-swellable polymer, the hydrocarbon-swellable polymer present in the composition in an amount between about 10 and 30 percent by weight;
    an oil-resistant polymer, the oil-resistant polymer present in the composition in an amount between about 10 and 30 percent by weight; and
    a hydrocarbon swelling agent, the hydrocarbon swelling agent present in the composition in an amount between about 15 and 60 percent by weight.

2. The composition defined in claim 1, wherein the hydrocarbon-swellable polymer is selected from the group consisting of ethylene propylene diene rubber ethylene propylene rubber, styrene butadiene rubber, butyl rubber, neoprene rubber, silicone rubber, and ethylene vinyl acrylate.

3. The composition defined in claim 1, wherein the hydrocarbon-swellable polymer is ethylene propylene diene rubber.

4. The composition defined in claim 1, wherein the hydrocarbon-swellable polymer is present in an amount between about 15 and 25 percent by weight.

5. The composition defined in claim 1, wherein the oil-resistant polymer is a nitrile rubber material.

6. The composition defined in claim 5, wherein the nitrile rubber material is hydrogenated nitrile butadiene rubber.

7. The composition defined in claim 1, wherein the hydrocarbon-swelling agent is present in an amount of between about 30 and 45 percent by weight.

8. The composition defined in claim 1, wherein the hydrocarbon-swelling agent comprises a low molecular weight polymer.

9. The composition defined in claim 1, wherein the hydrocarbon-swelling agent comprises a sorbent for hydrocarbons.

10. The composition defined in claim 1, wherein the hydrocarbon-swelling agent comprises a polymeric material.

11. The composition defined in claim 1, wherein the composition further comprises one or more of a polymerization initiator, activator, accelerator, vulcanizing agent, heat stabilizer, antioxidant, antiozonant, coupling agent, and pigment.

12. A composition suitable for use in a packer element for a wellbore, comprising:
   a hydrocarbon-swellable polymer, the hydrocarbon-swellable polymer present in the composition in an amount between about 15 and 25 percent by weight;
   a nitrile rubber material, the nitrile rubber material present in the composition in an amount between about 15 and 25 percent by weight; and
   a hydrocarbon swelling agent, the hydrocarbon swelling agent present in the composition in an amount between about 30 and 45 percent by weight.

13. The composition defined in claim 12, wherein the hydrocarbon-swellable polymer is selected from the group consisting of ethylene propylene diene rubber, ethylene propylene rubber, styrene butadiene rubber, butyl rubber, neoprene rubber, silicone rubber, and ethylene vinyl acrylate.

14. The composition defined in claim 12, wherein the hydrocarbon-swellable polymer is ethylene propylene diene rubber.

15. The composition defined in claim 12, wherein the nitrile rubber material is selected from the group consisting of nitrile butadiene rubber, hydrogenated nitrile butadiene rubber and carboxylated nitrile butadiene rubber.

16. The composition defined in claim 12, wherein the nitrile rubber material is hydrogenated nitrile butadiene rubber.

17. The composition defined in claim 12, wherein the hydrocarbon-swelling agent comprises a low molecular weight polymer.

18. The composition defined in claim 12, wherein the hydrocarbon-swelling agent comprises a sorbent for hydrocarbons.

19. The composition defined in claim 12, wherein the hydrocarbon-swelling agent comprises polyethylene.

20. The composition defined in claim 12, wherein the composition further comprises one or more of a polymerization initiator, activator, accelerator, vulcanizing agent, heat stabilizer, antioxidant, antiozonant, coupling agent, and pigment.

21. A composition suitable for use in a packer element for a wellbore, comprising:
   ethylene propylene diene rubber present in the composition in an amount between about 15 and 25 percent by weight;
   hydrogenated nitrile butadiene rubber present in the composition in an amount between about 15 and 25 percent by weight; and
   a hydrocarbon swelling agent comprising polyethylene present in the composition in an amount between about 30 and 45 percent by weight.

22. A packer assembly, comprising:
   a tubular member; and
   a packer element, the packer element comprising a composition that includes:
   a hydrocarbon-swellable polymer, the hydrocarbon-swellable polymer present in the composition in an amount between about 10 and 30 percent by weight;
   an oil-resistant polymer, the oil-resistant polymer present in the composition in an amount between about 10 and 30 percent by weight; and
   a hydrocarbon swelling agent, the hydrocarbon swelling agent present in the composition in an amount between about 15 and 60 percent by weight.

* * * * *

UNITED STATES PATENT AND TRADEMARK OFFICE
CERTIFICATE OF CORRECTION

PATENT NO. : 7,994,257 B2  
APPLICATION NO. : 12/366725  
DATED : August 9, 2011  
INVENTOR(S) : De et al.

Page 1 of 1

It is certified that error appears in the above-identified patent and that said Letters Patent is hereby corrected as shown below:

In the Patent:  
Column 4, Line 15: Please start a new paragraph after "scenarios."

In the Claims:  
Column 6, Claim 2, Line 65: Please correct "rubber ethylene propylene" to read -- rubber, ethylene propylene --

Signed and Sealed this  
Eighth Day of November, 2011

David J. Kappos  
*Director of the United States Patent and Trademark Office*